(12) United States Patent
Masuda

(10) Patent No.: US 8,259,379 B2
(45) Date of Patent: Sep. 4, 2012

(54) OPTICAL SCANNING DEVICE AND IMAGE FORMING APPARATUS

(75) Inventor: Koji Masuda, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 433 days.

(21) Appl. No.: 12/165,850

(22) Filed: Jul. 1, 2008

(65) Prior Publication Data

US 2009/0015896 A1 Jan. 15, 2009

(30) Foreign Application Priority Data

Jul. 10, 2007 (JP) ................................. 2007-181305

(51) Int. Cl.
G02B 26/08 (2006.01)

(52) U.S. Cl. .................. 359/204.1; 359/204.5

(58) Field of Classification Search ............... 359/15, 359/204.1, 204.5, 205.1, 358, 559, 563, 569, 359/572; 347/236, 246; 250/205, 552; 385/37, 385/92, 93
See application file for complete search history.

(56) References Cited

U.S. PATENT DOCUMENTS

| | | | |
|---|---|---|---|
| 5,875,051 A | 2/1999 | Suzuki et al. | |
| 5,991,063 A * | 11/1999 | Ando | 359/204.1 |
| 6,069,724 A | 5/2000 | Hayashi et al. | |
| 6,075,638 A | 6/2000 | Masuda | |
| 6,081,386 A | 6/2000 | Hayashi et al. | |
| 6,384,949 B1 | 5/2002 | Suzuki | |
| 6,456,314 B1 | 9/2002 | Masuda | |
| 6,462,879 B2 | 10/2002 | Masuda | |
| 6,487,015 B2 * | 11/2002 | Kitamura et al. | 359/558 |
| 6,496,214 B1 | 12/2002 | Masuda et al. | |
| 6,686,946 B2 | 2/2004 | Masuda et al. | |
| 6,717,606 B2 | 4/2004 | Masuda | |
| 6,724,414 B2 | 4/2004 | Masuda et al. | |
| 7,068,295 B2 | 6/2006 | Masuda | |
| 7,593,150 B2 | 9/2009 | Masuda | |
| 7,604,590 B2 | 10/2009 | Tokuda et al. | |
| 7,897,907 B1 * | 3/2011 | Waters et al. | 250/214 R |
| 2005/0067944 A1 | 3/2005 | Masuda et al. | |
| 2005/0093963 A1 | 5/2005 | Masuda | |
| 2006/0209372 A1 | 9/2006 | Tada | |
| 2006/0256183 A1 | 11/2006 | Masuda | |
| 2007/0146473 A1 * | 6/2007 | Masuda | 347/246 |
| 2008/0084594 A1 | 4/2008 | Masuda | |

FOREIGN PATENT DOCUMENTS

| | | |
|---|---|---|
| JP | 4-321370 | 11/1992 |
| JP | 6-106775 | 4/1994 |
| JP | 6-164070 | 6/1994 |
| JP | 7-9699 | 1/1995 |
| JP | 7-281114 | 10/1995 |
| JP | 9-288244 | 11/1997 |
| JP | 10-301047 | 11/1998 |
| JP | 2002-40350 | 2/2002 |
| JP | 2004-70278 | 3/2004 |
| JP | 2006-259098 | 9/2006 |
| JP | 2007-241240 | 9/2007 |

* cited by examiner

*Primary Examiner* — Frank Font

(74) *Attorney, Agent, or Firm* — Oblon, Spivak, McClelland, Maier & Neustadt, L.L.P.

(57) ABSTRACT

An optical scanning device, which scans a surface to be scanned by light, includes a light source, a coupling optical system, which changes light from the light source into approximately parallel light, a light control reflection member which is disposed in an optical path of the light from the coupling optical system, the light control reflection member defining a diameter of a beam of the light which scans the surface to be scanned, and reflecting a part of the light which is not used for the scanning toward the coupling optical system, and a light detector which receives the light reflected by the light control reflection member via the coupling optical system.

15 Claims, 10 Drawing Sheets

OPTICAL SCANNING DEVICE AND IMAGE FORMING APPARATUS

PRIORITY CLAIM

The present application is based on and claims priority from Japanese Patent Application No. 2007-181305, filed on Jul. 10, 2007, the disclosure of which is hereby incorporated by reference in its entirety.

BACKGROUND OF THE INVENTION

Field of the Invention

The present invention relates to an optical scanning device and an image forming apparatus, more particularly, to an optical scanning device, which scans a surface to be scanned by light, and an image forming apparatus having the optical scanning device.

In an image forming apparatus such as a laser printer and a digital copier, light from a light source, which is modulated according to image information, is condensed onto a surface of a photoconductor via a deflector and a scanning lens, and the surface of the photoconductor is scanned in a predetermined direction (main-scanning direction), so that a latent image (electrostatic latent image) is formed on the surface of the photoconductor. Then, by transferring toners onto the latent image, the image information is visualized.

Recently, the improvements in printing speed and writing density of an image forming apparatus are desired. As one method for achieving those improvements, there is a method for increasing a deflection speed of a deflector. However, this method has problems such as noise and heat caused by high speed rotation, and the increase in the deflection speed of the deflector is limited. On the other hand, as another method, there is a method for scanning at one time by means of a plurality of light beams.

A multi-beam scanning device, which enables scanning by a plurality of light beams, can be achieved by substituting a conventional single beam light source which emits one light beam (a light source using a laser having one light-emitting section in one package) with a multi-beam light source which emits a plurality of light beams (a light source using a laser array having a plurality of light-emitting sections in one package). Many methods are also proposed, each of which conducts scanning with a plurality of light beams by using a plurality of single beam light sources.

A semiconductor laser is generally used as a light source, and conventionally, an end surface-emitting laser is a popular light source. However, a surface-emitting laser called VCSEL (Vertical Cavity Surface Emitting Laser) is recently used. Since the arraying of the surface-emitting lasers is easier than the arraying of the end surface-emitting lasers, the arraying of 16 to 32 beams or more can be achieved in the surface-emitting laser, relative to the arraying of about 4 to 8 beams in the end surface-emitting laser. For this reason, the surface-emitting laser is expected as a light source for improving the printing speed and the writing density of the image forming apparatus.

By the way, in the optical scanning device using the conventional end surface-emitting laser, an APC control (Auto Power Control) is conducted for controlling the density variations caused by the variation in the light output of the light source, while monitoring the light emitted backward. However, since the surface-emitting laser does not generate the light emitted backward because of its structure, an APC control different from the conventional APC control is required in the optical scanning device using a surface-emitting laser.

Consequently, it is considered to guide a part of the light emitted from the surface-emitting laser to a light detector by dividing the light by means of optical elements such as a beam splitter and a half mirror, and to control the driving current of the surface-emitting laser based on the output of the light detector.

For example, an optical scanning device is disclosed in JP H09-288244A, which guides a plurality of light beams emitted from a light source having a plurality of light-emitting sections to a deflector by an optical member, and guides a plurality of light beams deflected by the deflector onto a surface to be scanned by an imaging member, so as to simultaneously scan the surface to be scanned by a plurality of light beams. In such an optical scanning device, a deflection control unit for controlling the deflection direction of a plurality of light beams is disposed in the optical path between the light source and the deflector.

An optical scanning device is also disclosed in JP2002-40350A, which scans and exposes a surface to be scanned by deflecting with a deflector a laser beam emitted from a surface-emitting laser and collimated by a collimator lens, and reflects a part of the laser beam by a beam separation unit, so as to detect the light volume by a light receiving element. In such an optical scanning device, an aperture which forms a laser beam is provided between the beam separation unit and the collimator lens.

However, in the optical scanning devices disclosed in JP H09-288244A and JP2002-40350A, since the divided light is significantly deviated from the optical path from the light source toward the deflector (light deflector), the light detector is disposed in a position away from the light source, resulting in the increase in the size of the optical scanning device. When the light detector is disposed near the light source, a folding mirror or the like is required for folding the optical path of the divided light in the light source direction, resulting in the increase in the costs. In this case, if the size of the light detector is reduced, a condenser member is required.

As to the light output of the light source, the current surface-emitting laser includes the light output of about 1 to 2 mW relative to the light output of several mW to several tens of mW or more of the conventional end surface-emitting laser. Accordingly, if a part of the light beam which is used for forming an image as described above is divided to be guided to the light detector, the output of the light beam required for forming an image is reduced, and the improvement in the printing speed of the image forming apparatus is disturbed. Therefore, a method of controlling light volume using a light beam which is not used for forming an image is desired.

For example, an optical scanning device having a light receiving section which is disposed in an optical path between a light source and a deflector and in an area outside an opening diameter of an aperture stop in the effective luminous flux diameter of a luminous flux from the light source is disclosed in JP H04-321370A. In such an optical scanning device, the luminous flux from the light source is guided onto a surface to be scanned via an imaging lens after deflecting the luminous flux by the deflector via the aperture stop. When the surface to be scanned is scanned by rotating the deflector, the emission light volume from the light source is controlled by using the output signals from the light receiving section.

However, similar to the optical scanning devices disclosed in JP H09-288244A and JP 2002-40350A, the optical scanning device disclosed in JP H04-321370A has problems in that (1) the light detector is disposed in a position away from the light source, so the size of the device is increased, and (2)

the negative influence of reflection light from the light receiving section is concerned by disposing the light receiving section of an electric component near the opening diameter.

SUMMARY OF THE INVENTION

The present invention has been made in view of the above problems, and a first object of the present invention is to provide an optical scanning device which can detect an intensity of light emitted from a light source with high accuracy without increasing the size and the costs, and reducing light use efficiency.

A second object of the present invention is to provide an image forming apparatus which can form a high quality image without increasing the size and the costs.

In order to achieve the first object, the present invention relates to an optical scanning device, which scans a surface to be scanned by light, including a light source, a coupling optical system, which changes light from the light source into approximately parallel light, a light control reflection member which is disposed in an optical path of the light from the coupling optical system, the light control reflection member defining a diameter of a beam of the light which scans the surface to be scanned, and reflecting a part of the light which is not used for the scanning toward the coupling optical system, and a light detector which receives the light reflected by the light control reflection member via the coupling optical system.

In order to achieve the second object, the present invention relates to an image forming apparatus including at least one object to be scanned, and at least one optical scanning device according to an embodiment of the present invention, which scans the object to be scanned by light having image information.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principle of the invention.

DETAILED DESCRIPTION OF THE PREFERRED EMBODIMENTS

Figure 1:
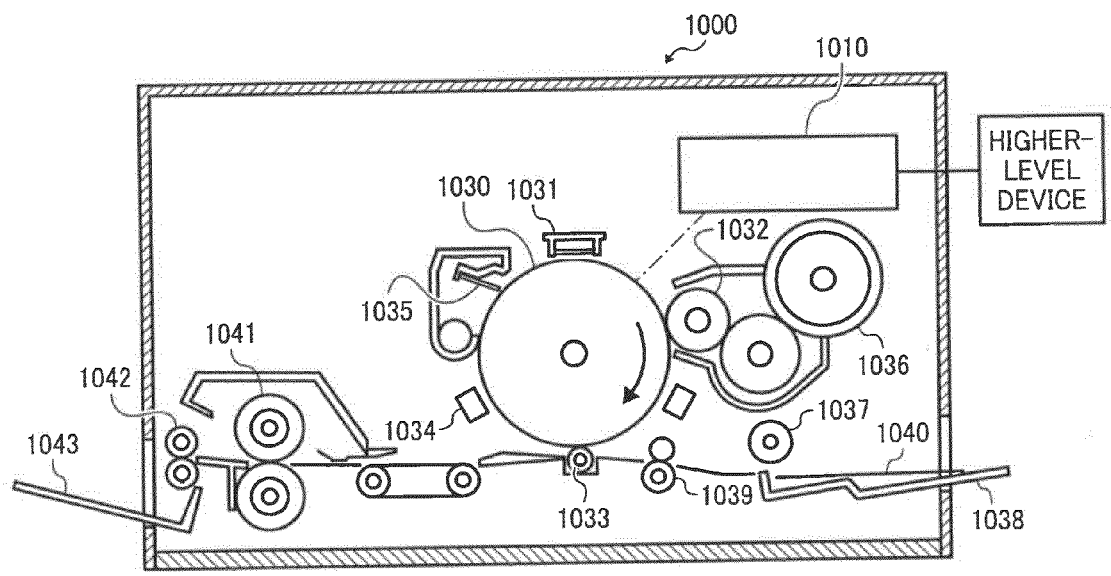
FIG. 1 is a view illustrating a schematic structure of a laser printer according to one embodiment of the present invention.

Hereinafter, an embodiment of the present invention will be described with reference to FIGS. 1-6. FIG. 1 illustrates a schematic structure of a laser printer 1000 as an image forming apparatus according to an embodiment of the present invention.

The laser printer 1000 includes an optical scanning device 1010, a photoconductive drum 1030, a charger 1031, a development roller 1032, a transferring charger 1033, an electric removal unit 1034, a cleaning blade 1035, a toner cartridge 1036, a paper feeding roller 1037, a paper discharge tray 1038, a resist roller pair 1039, a fixing roller 1041, a paper discharge roller 1042, and a paper discharge tray 1043.

The photoconductive drum 1030 includes on the surface thereof a photosensitive layer. More particularly, the surface of the photoconductive drum 1030 is a surface to be scanned. In this case, the photoconductive drum 1030 rotates in the arrow direction in FIG. 1.

The charger 1031, the development roller 1032, the transfer charger 1033, the electric removal unit 1034, and the cleaning blade 1035 are disposed near the surface of the photoconductive drum 1030. Those are disposed in order of the charger 1031→the development roller 1032→the transfer charger 1033→the electric removal unit 1034→the cleaning blade 1035, regarding the rotation direction of the photoconductive drum 1030.

The charger 1031 uniformly charges the surface of the photoconductive drum 1030.

The optical scanning device 1010 scans the surface of the photoconductive drum 1030 charged by the charger 1031 by means of the light modulated according to the image information from a higher-level device (for example, a personal computer). A latent image corresponding to the image information is thereby formed on the surface of the photoconductive drum 1030. The latent image formed thereon moves in the direction of the development roller 1032 along the rotation of the photoconductive drum 1030. In this case, the longitudinal direction of the photoconductive drum 1030 (the direction along the rotation shaft) is called a main scanning direction, and the rotation direction of the photoconductive drum 1030 is called a sub-scanning direction. An area in which a latent image is formed in a scanning area of the main-scanning direction from the scanning start position to the scanning end position in the photoconductive drum 1030 is called an effective image forming area. In addition, the structure of the optical scanning device 1010 will be described later.

The toners are stored in the toner cartridge 1036, and the toners are supplied to the development roller 1032.

The development roller 1032 visualizes the image information by transferring the toners supplied from the toner cartridge 1036 to the latent image formed on the surface of the photoconductive drum 1030. In this case, the latent image onto which the toners are transferred (hereinafter, refer to a toner image) moves in the direction of the transfer charger 1033 along the rotation of the photoconductive drum 1030.

A recording paper 1040 is stored in the paper feeding tray 1038. The paper feeding roller 1037 is disposed near the paper feeding tray 1038. The paper feeding roller 1037 draws the recording paper 1040 one by one from the paper feeding tray 1038, and feeds the paper to the resist roller pair 1039. The resist roller pair 1039 temporarily retains the recording paper 1040 drawn by the paper feeding roller 1037, and feeds the recording paper 1040 to the space between the photoconductive drum 1030 and the transfer charger 1033 in accordance with the rotation of the photoconductive drum 1030.

A voltage having an electrode opposite to the electrode of the voltage of the toners is applied to the transfer charger 1033 for electrically drawing onto the recording paper 1040 the toners on the surface of the photoconductive drum 1030. By this voltage, the toner image on the surface of the photoconductive drum 1030 is transferred onto the recording paper 1040. The recording paper 1040 transferred therein is fed to the fixing roller 1041.

Heat and pressure is applied to the recording paper 1040 by the fixing roller 1041. The toners are thereby fixed onto the recording paper 1040. The recording paper 1040 fixed therein is fed to the paper discharge tray 1043 via the paper discharge roller 1042, and is sequentially stacked on the paper discharge tray 1043.

The electric removal unit 1034 removes the electricity on the surface of the photoconductive drum 1030.

The cleaning blade 1035 eliminates the toners (remaining toners) remaining on the surface of the photoconductive drum 1030. In addition, the eliminated toners are reused. The surface of the photoconductive drum 1030 from which the remaining toners are eliminated again returns to the position of the charger 1031.

Next, the structure of the optical scanning device 1010 will be described.

Figure 2:
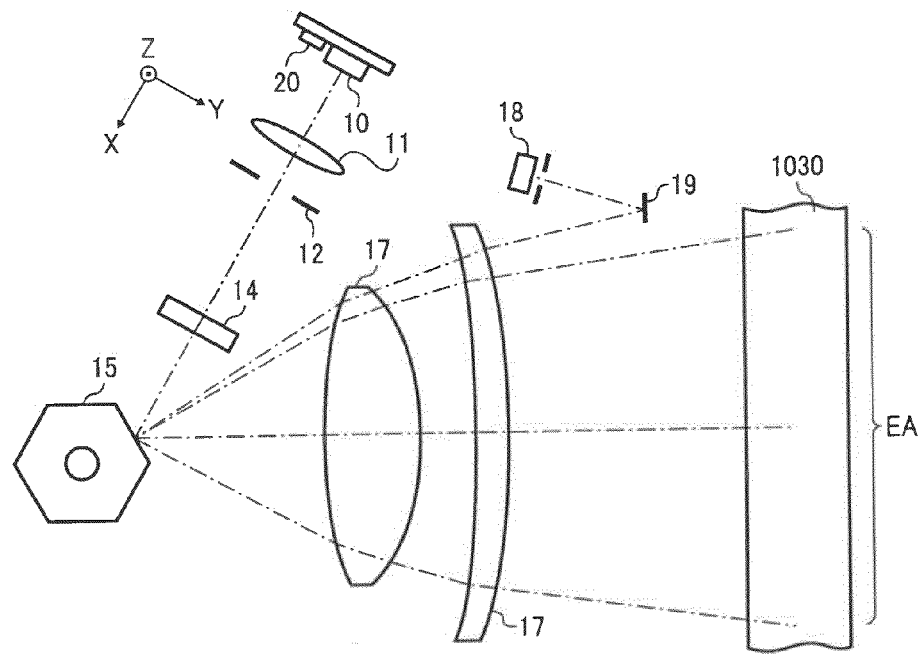
FIG. 2 is a schematic view illustrating an optical scanning device in FIG. 1.

As illustrated in FIG. 2 as one example, the optical scanning device 1010 includes a light source 10, a coupling lens 11, an opening member 12, a cylindrical lens 14, a polygon scanner 15, two fθ lenses 17, 17, a synchronization sensor 18, a reflection mirror 19, a light detector 20 and a processor (not shown in FIG. 2). In addition, in this description, the light-emitting direction from the light source 10 is the X-axis direction, and the two directions orthogonal to each other in the plane perpendicular to the X-axis direction are the Y-axis direction and the Z-axis direction, respectively.

Figure 3:
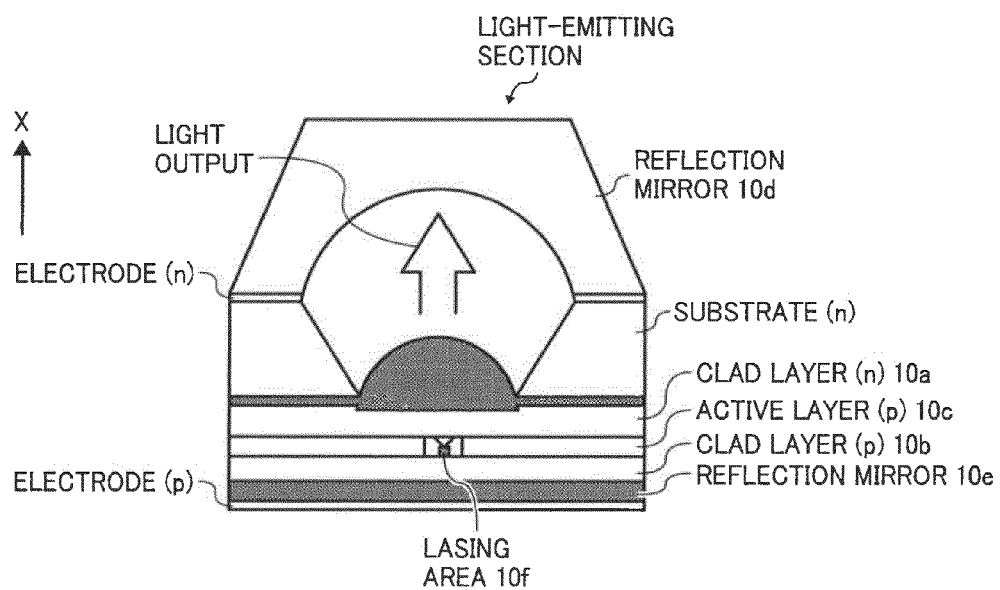
FIG. 3 is a view describing a light-emitting section of a surface-emitting laser.

The light source 10 includes a surface-emitting laser array having a plurality of light-emitting sections. Each of the light-emitting sections includes a structure having an active layer 10c, clad layers 10a, 10b, and reflection mirrors 10d, 10e as illustrated in FIG. 3 as one example. In each of the light-emitting sections, the active layer is sandwiched between the two clad layers 10a, 10b, and the reflection mirrors 10d, 10e each having a high reflection rate are formed in the upper side of the clad layer 10a and the lower side of the clad layer 10b, respectively. The area sandwiched between the two reflection mirrors (10d, 10e) is a so-called Fabry-Perot resonator perpendicular to the substrate, and a laser is generated in a lasing area 10f in the active layer 10c, so as to generate the laser light in the direction perpendicular to the substrate. In addition, the light source 10 may include a plurality of surface-emitting lasers each having one light emitting section.

Referring to FIG. 2, the coupling lens 11 is disposed on the +X side of the light source 10, and changes the light emitted from the light source 10 into the parallel light.

The opening member 12 is disposed on the +X side of the coupling lens 11, defines the diameter of the light beam toward the polygon scanner 15, and also reflects toward the coupling lens 11 a part of the light which is not used for scanning.

The opening member 12 includes a light transmission section 12a which transmits light, a light reflection section 12b which reflects light, and a light shielding section 12c which blocks light.

In this case, the light transmission section 12a is an opening member roughly positioned in the center of the substrate. Moreover, it is not necessary for the substrate to be a transparent member, and the substrate can be a non-transparent member because light does not go through the substrate.

Figure 4A:
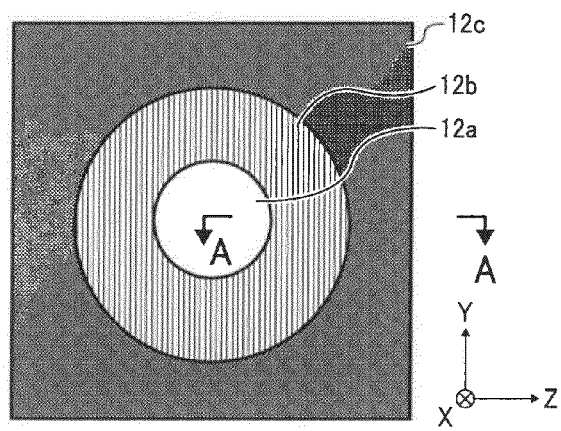
FIG. 4A is a view describing an aperture member in FIG. 2.
Figure 4B:
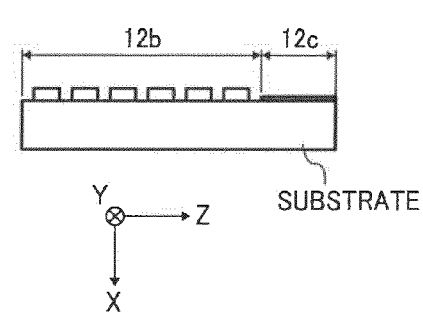
FIG. 4B is an A-A sectional view in FIG. 4A.

The light reflection section 12b is a reflection diffractive face disposed in the circumference of the light transmission section 12a. The diffractive pattern of this reflection diffractive face is a so-called one-dimensional periodic grating pattern in which a plurality of gratings each extending in the same direction is disposed at approximately equal intervals. As illustrated in FIG. 4B, the reflection diffractive face includes a cross section having an approximately square shape. The reflection diffractive face also has a two-staged height structure, so it is called a binary structure.

The one-dimensional periodic grating pattern is also called a one-dimensional periodic structure. The reflection diffractive face having this one-dimensional periodic structure reflects the entering parallel light in a state substantially parallel to the direction of the reflection diffractive angle determined by the cycle.

Such a reflection diffractive face can be formed with various cycles from a submilli-level to nano-level by using a fine processing technique such as exposing and etching or a transfer processing technique such as imprint and injection molding. In addition, a multi-staged height structure is called a multi-level structure. However, the difficulty of the processing technique of the multi-level structure is increased, so the binary structure is preferable.

A metal film for reflection (not shown) is evaporated onto the surface of the light reflection section 12b.

It is possible to form a refractive one-dimensional grating pattern by achieving a polarization separation mirror with a sub-wavelength structure. In this case, the metal film for reflection is unnecessary.

The light shielding section 12c is disposed to surround the light reflection section 12b.

Figure 5:
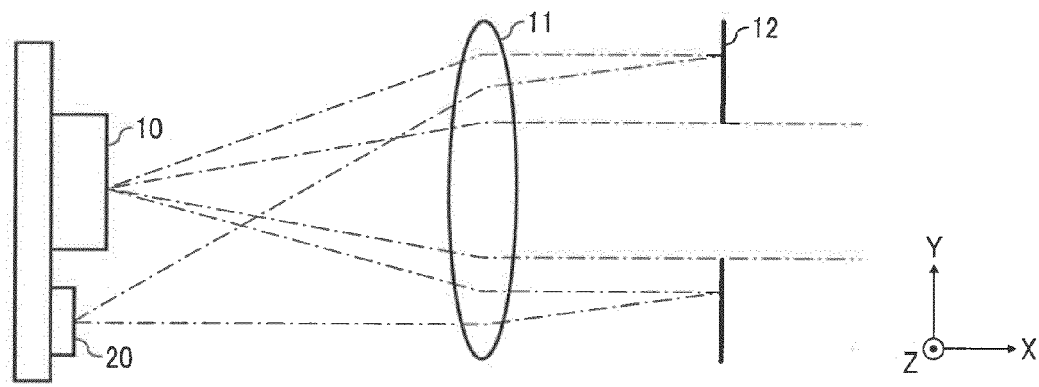
FIG. 5 is a view describing light reflected by the opening member.

As illustrated in FIG. 5 as one example, the light entered into the light transmission section 12a of the light entered into the opening member 12 via the coupling lens 11 goes through the opening member 12. On the other hand, the light entered into the light reflection section 12b reflects at a predetermined angle with the approximately parallel light. In addition, the light entered into the light shielding section 12c is absorbed.

The light reflected by the light reflection section 12b enters into the coupling lens 11, and is collected by the coupling lens 11 so as to be a convergent light state. Then, the light is received by the light detector 20 disposed near the convergent position. The light detector 20 outputs a signal (a photoelectric conversion signal) corresponding to the light receiving amount. In this case, the light source 10 and the light detector 20 are integrated.

As illustrated in FIG. 2, the light after passing through the light transmission section 12a of the opening member 12 enters into the cylindrical lens 14. This cylindrical lens 14 forms a linear image elongated in the direction corresponding to the main-scanning direction near the deflecting reflection face (polygon mirror face) of the polygon scanner 15.

The light deflected by the polygon scanner 15 is imaged by the fθ lens 17, and concentrates on the surface of the photoconductive drum 1030 as a spot.

The polygon scanner 15 rotates at a predetermined speed by a polygon motor (not shown). The light entered into the deflecting reflection face is deflected at an equal angular speed along the rotation of the polygon scanner 15. The light spot on the surface of the photoconductive drum 1030 thereby moves at an equal speed in the main-scanning direction.

In addition, a part of the light toward the outside of the effective image formation area EA after passing through the fθ lens 17 is received by the synchronization sensor 18 via the reflection mirror 19. The synchronization sensor 18 outputs a signal (photoelectric conversion signal) corresponding to the light receiving amount.

Figure 6:
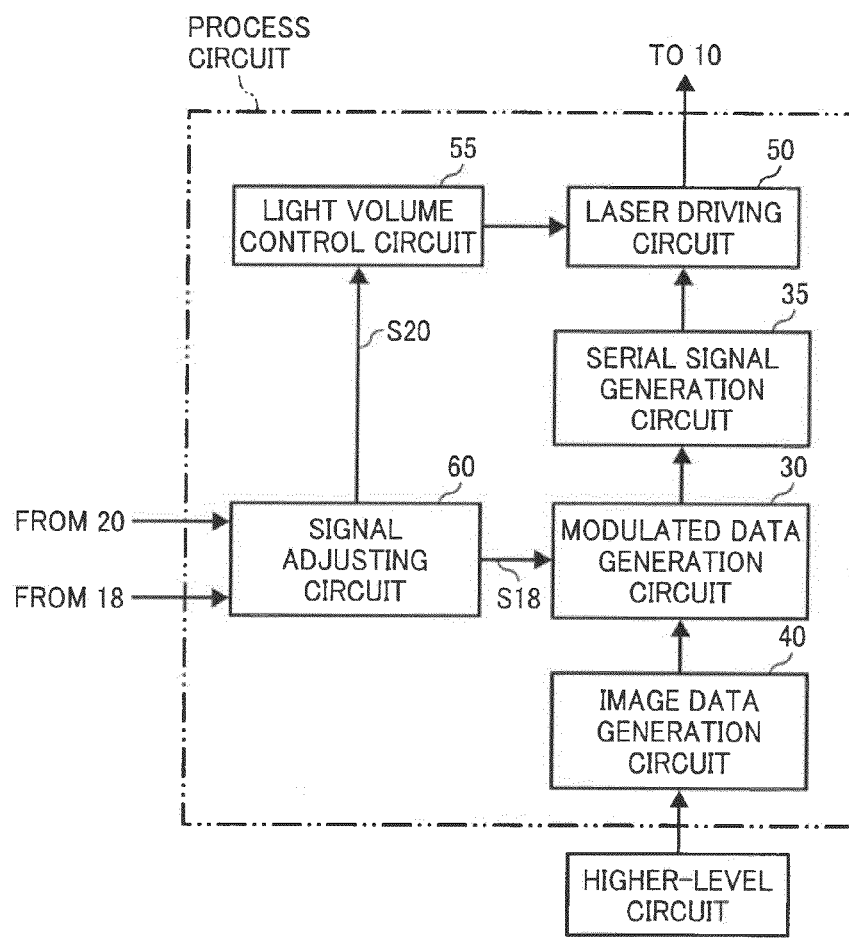
FIG. 6 is a view describing a processing circuit.

As illustrated in FIG. 6, the processing circuit includes a signal adjusting circuit 60, a modulated data generation circuit 30, a serial signal generation circuit 35, an image data generation circuit 40, a light volume control circuit 55, and a laser driving circuit 50.

The signal adjusting circuit 60 generates a signal S18 by amplifying, reversing and digitizing the output signal from the synchronization sensor 18. If the light enters into the synchronization sensor 18, the signal S18 changes from H (high level) to L (low level). In addition, the signal adjusting circuit 60 generates a signal S20 by amplifying and digitizing the output signal from the light detector 20.

The image data generation circuit 40 generates image data according to the image information from a higher-level device.

The modulated data generation circuit 30 generates the modulated data according to the signal S18 from the signal adjusting circuit 60 and the image data from the image data generation circuit 40.

The serial signal generation circuit 35 converts the modulated data from the modulated data generation circuit 30 into a serial signal.

The light volume control circuit 55 generates APC information according to the signal S20 from the signal adjusting circuit 60, such that the intensity of the light emitted from the light source 10 maintains a predetermined value.

The laser driving circuit 50 generates a driving signal of the surface-emitting laser array of the light source 10 according to the serial signal from the serial signal generation circuit 35 and the APC information from the light volume control circuit 55. The driving signal generated therein is output to the light source 10.

As is apparent from the above description, in the optical scanning device 1010 according to the present embodiment, a coupling optical system is achieved by the coupling lens 11, and a light control reflection member is achieved by the opening member 12.

As described above, in the optical scanning device 1010 according to the present embodiment, the diverging light emitted from the light source 10 enters into the opening member 12 after being changed into the approximately parallel light by the coupling lens 11. The opening member 12 includes the light transmission section 12a which transmits light and the light reflection section 12b which reflects light. Thereby, the diameter of the light beam toward the polygon scanner 15 is defined by the light transmission section 12a, and a part of the light which is not used for scanning is reflected toward the coupling lens 11 by the light reflection section 12b. Therefore, the light detector 20 can be disposed near the light source 10.

In addition, since a unit which defines a diameter of a light beam toward the polygon scanner 15 is integrally formed with a unit which extracts light for monitoring the intensity of the light emitted from the light source 10, the number of parts can be reduced.

Moreover, since the coupling lens 11 is used as a lens, which collects the light reflected by the opening member 12, the number of parts can be reduced.

Furthermore, since the light source 10 is integrally formed with the light detector 20, the positional adjustment can be simplified. In this case, a substrate for a light source circuit can be used as a substrate for a light detector circuit. Thereby, the substrate size can be reduced by an appropriate circuit layout design. The functions can be summarized. Accordingly, the optical scanning device can be further downsized, and the costs of the device can be further reduced.

Therefore, without increasing the size and the costs and reducing the light use efficiency, the intensity of the light emitted from the light source can be detected with high accuracy.

In addition, since the APC control is conducted according to the output signal of the light detector 20, the fluctuation in the intensity of the light emitted from each of the light-emitting sections can be reduced.

Moreover, since the laser printer 1000 according to the present embodiment includes the optical scanning device 1010, the fluctuation in the light intensity of the light spot formed on the photoconductive drum 1030 can be controlled without increasing the size and the costs. More particularly, the fluctuation in the density of an image can be controlled. Therefore, a high quality image can be formed without increasing the size and the costs.

Furthermore, since the laser printer 1000 according to the present embodiment uses the surface-emitting laser array as the light-emitting source, the simultaneous scanning can be conducted by a plurality of light beams, and the improvements in the printing speed and writing intensity can be achieved. When the printing speed and the scanning density are the same, the rotation speed of the polygon scanner 15 can be reduced, compared with the rotation speed of the conventional laser printer which scans by a single light beam at one time. Therefore, the power consumption, the noise along the rotation, and the heat generation can be reduced.

In the above embodiment, the light transmission section 12a is the opening section, but the light transmission section 12a is not limited thereto. A transparent member such as glass or a resin can be provided in the light transmission section 12a. By the way, if a simple transparent parallel plate is used as the light transmission section 12a, the surface reflection is caused, and the light which is used for forming an image is lost. The loss of both faces by the reflection in general glass or resin reaches up to about 8%.

Figure 7:
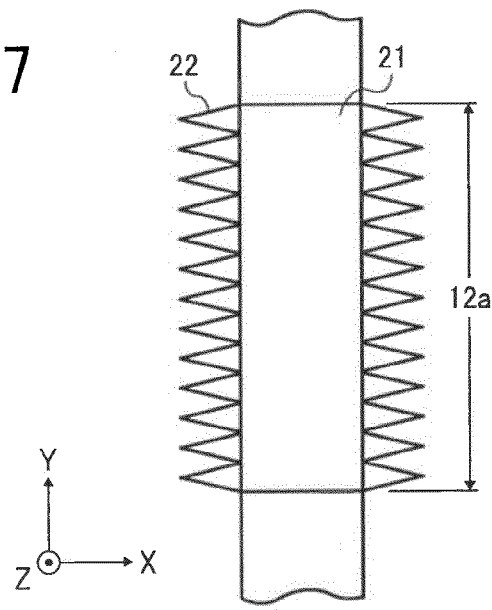
FIG. 7 is a view illustrating a modification example 1 of a light transmission section of an opening member.

In this case, a fine non-reflection structure having a size of a wavelength order can be provided in at least one face of the transparent parallel plate. For example, as illustrated in FIG. 7, a transparent parallel plate 21 is used as a substrate, and a periodic structure 22 having triangular projections can be provided on the surface of the transparent parallel plate 21 as the fine non-reflection structure. If the periodic structure 22 has a cycle which is shorter than the wavelength of the transmitted light, the structure is called a sub-wavelength structure, and the reflection rate can be reduced by appropriately selecting the shape or the cycle.

Figure 8:
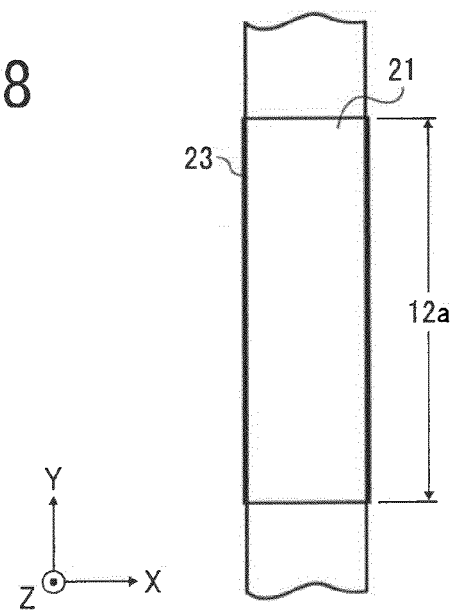
FIG. 8 is a view illustrating a modification example 2 of a light transmission section of an opening member.

As illustrated in FIG. 8 as one example, at least one face of the transparent parallel plate 21 can be covered with a reflection prevention film 23.

Figure 9:
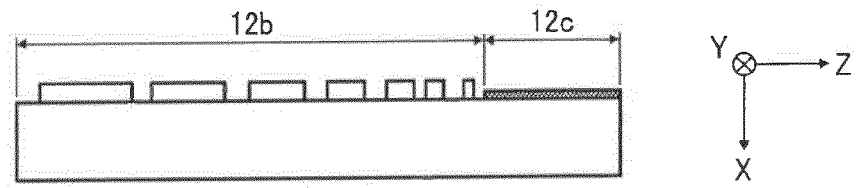
FIG. 9 is as view illustrating a modification example 1 of a light reflection section of the opening member.

In the above embodiment, the diffracting pattern of the reflection diffracting face in the light reflection section 12b is the one-dimensional periodic grating pattern. However, the diffracting pattern is not limited thereto. For example, as illustrated in FIG. 9, the diffracting pattern of the reflection diffracting face in the light reflection section 12b can be a one-dimensional non-periodic grating pattern. In this case, the light reflection section 12b has power which collects the light entering in parallel in the one-dimensional direction. Accordingly, the freedom degree of the optical layout of the coupling lens 11, the opening member 12, and the light detector 20 can be improved.

Figure 10A:
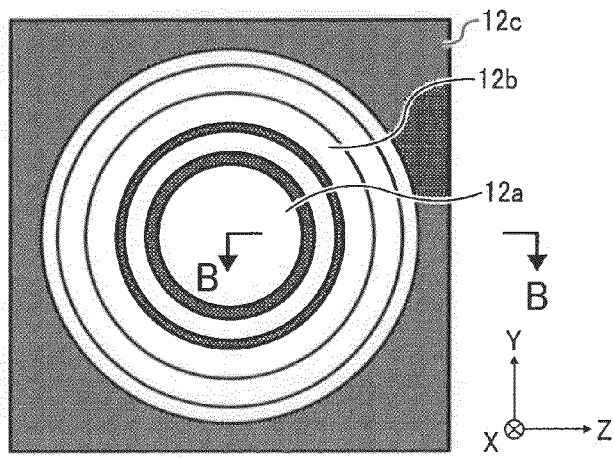
FIG. 10A is a view describing a modification example 2 of a light reflection section of the opening member.
Figure 10B:
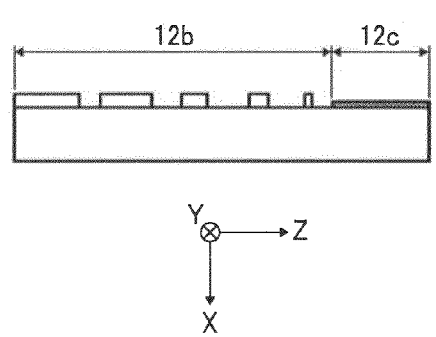
FIG. 10B is a B-B sectional view of FIG. 10A.

In the above embodiment, as illustrated in FIGS. 10A, 10B as one example, the diffracting pattern of the reflection diffracting face in the light reflection section 12b can be an orbicular zone-shaped diffracting pattern. In addition, a metal film for reflection (not shown) is evaporated to the surface. In this case, the light reflection section 12b includes power which collects the light entering in parallel in a certain point, and the freedom degree of the optical layout can be further improved.

Figure 11:
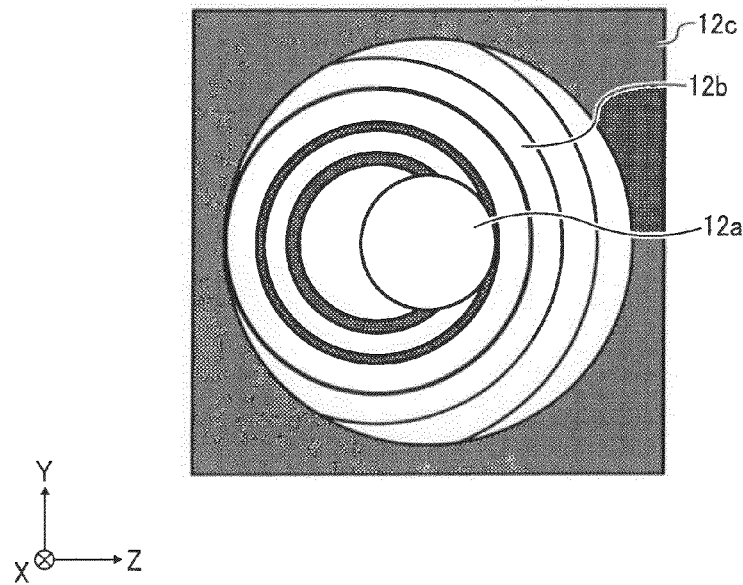
FIG. 11 is a view illustrating a modification example 3 of a light reflection section of an opening member.

In this case, as illustrated in FIG. 11 as one example, the orbicular zone-shaped diffracting pattern can be shifted in the YZ plane. More particularly, the center of the orbicular zone can be shifted from the center of the light transmission section 12a so as to be decentered. The convergent point can be thereby moved in the two-dimensional plane.

Figure 12:
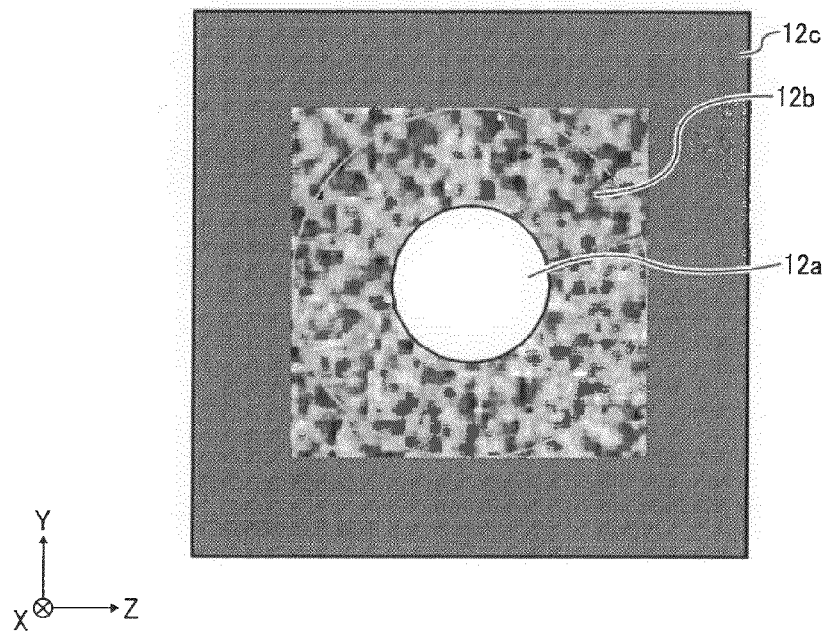
FIG. 12 is a view illustrating a modification example 4 of a light reflection section of an opening member.

As illustrated in FIG. 12 as one example, the diffracting pattern of the reflection diffracting face in the light reflection section 12b can be a computer-generated hologram (CGH) pattern. In this case, the reflection light can be a desired beam profile such as collecting, dividing, diffusing and forming, so the freedom degree of the optical layout can be further improved.

Figure 13:
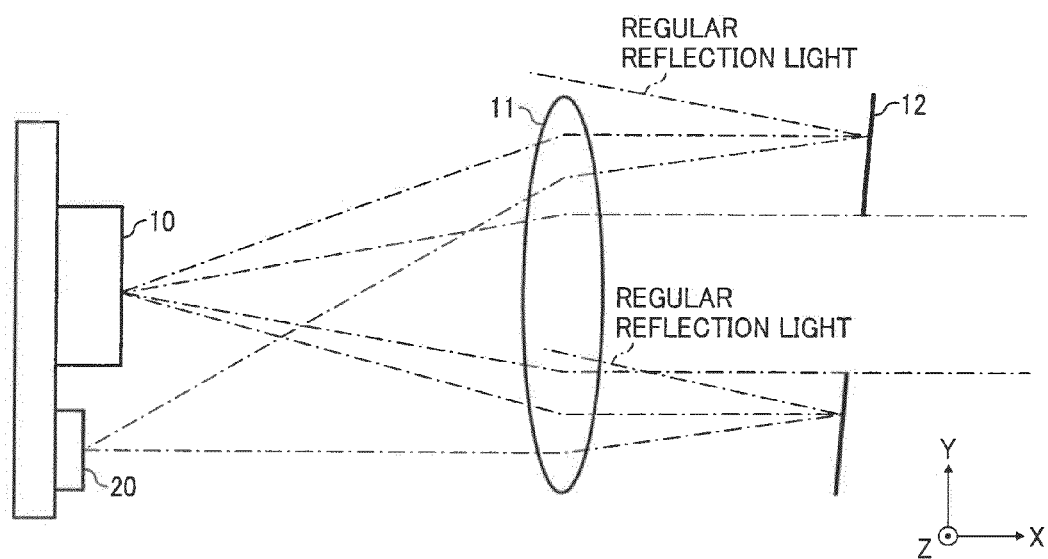
FIG. 13 is a view illustrating an inclination of an opening member.

By the way, there may a case in which the incident light regularly reflects and returns to the light source 10 via the coupling lens 11 by the manufacturing errors of the diffracting pattern in the light reflection section 12b. In this case, the light output of the surface-emitting laser may fluctuate by the influence of the returned light. Here, as illustrated in FIG. 13 as one example, the opening member 12 can be inclined relative to a virtual plane orthogonal to the incident direction of the light. Accordingly, even if the regular reflection is generated in the light reflection section 12b, the layout in which the light does not return to the light source side can be obtained. In addition, only the light reflection section 12b can be inclined.

Figure 14:
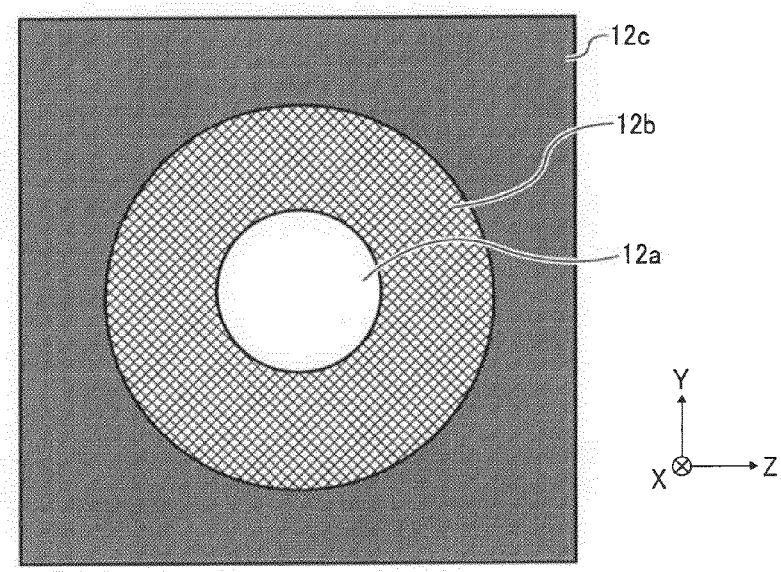
FIG. 14 is a view (part 1) illustrating a modification example 5 of a light reflection section of an opening member.
Figure 15:
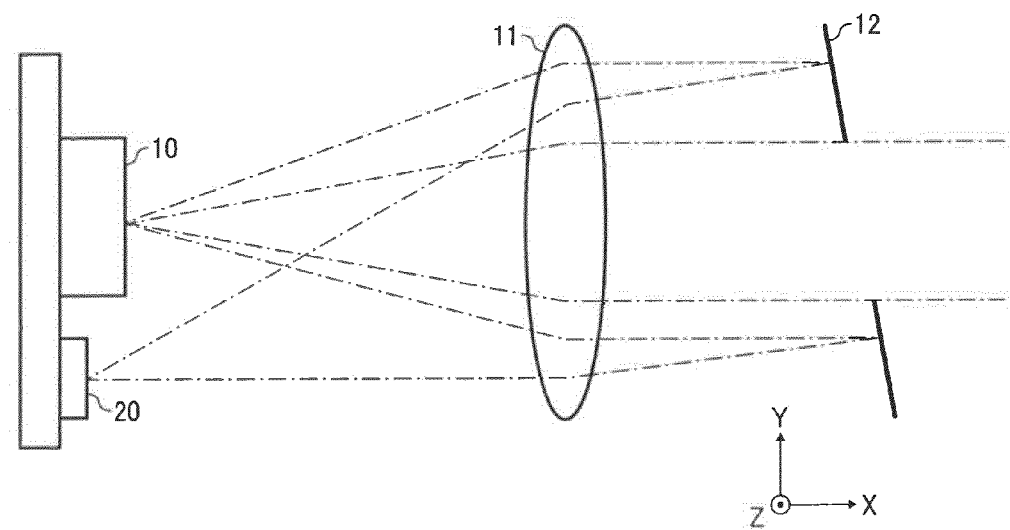
FIG. 15 is a view (part 2) illustrating a modification example 5 of a light reflection section of an opening member.
Figure 16A:
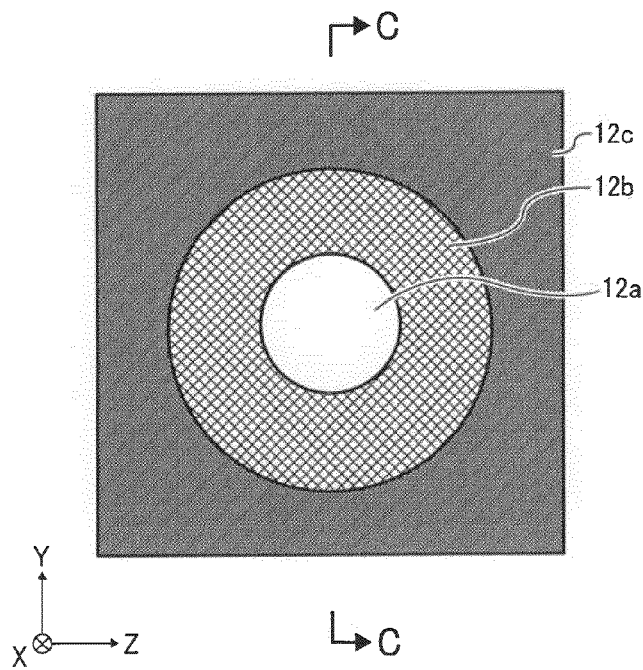
FIG. 16A is a view illustrating a modification example 6 of a light reflection section of an opening member.
Figure 16B:
FIG. 16B is a C-C sectional view of FIG. 16A.
Figure 17:
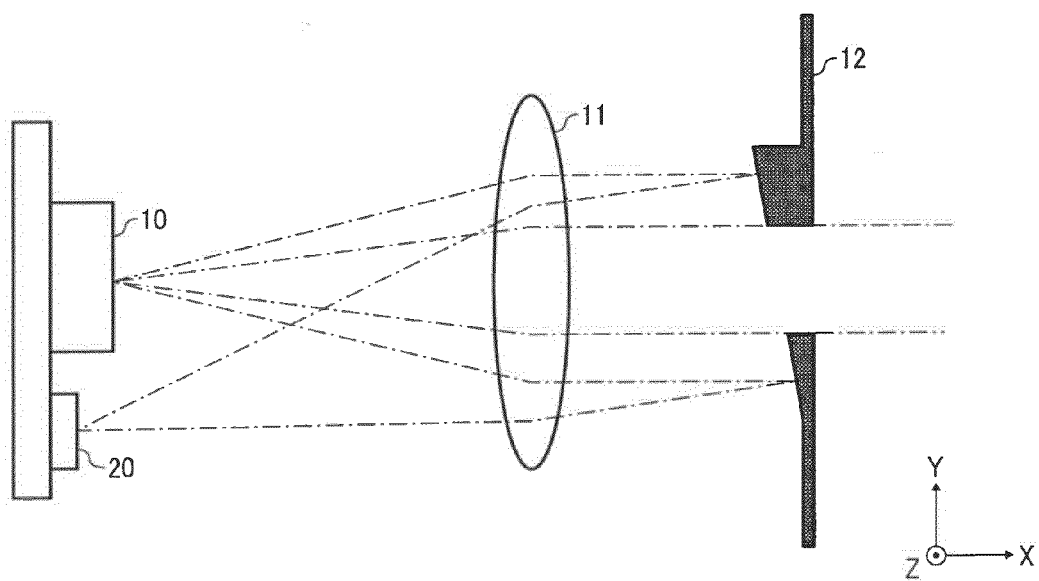
FIG. 17 is a view (part 2) illustrating a modification example 6 of a light reflection section of an opening member.

In the above embodiment, the light reflection section 12b is the reflection diffracting face for reflecting the incident light. However, the light reflection section 12b is not limited thereto. The light reflection section 12b can be a plane (mirror face) having a high reflection index (refer to FIG. 14). In this case, it is necessary for the opening member 12 to be inclined relative to the virtual plane orthogonal to the incident direction of the light (refer to FIG. 15), such that the light reflected by the light reflection section 12b is received by the light detector 20 via the coupling lens 11. In this case, as illustrated in FIGS. 16A, 16B, 17 as one example, only the surface (reflection face) of the light reflection section 12b can be inclined. FIG. 16B illustrates the cutting surface by the C-C in FIG. 16A, which is blacked out for the sake of simplicity.

Figure 18A:
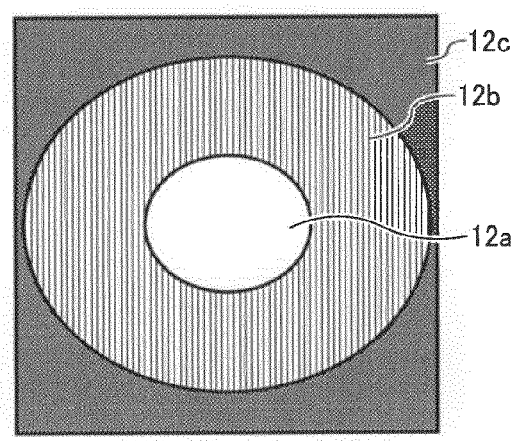
FIGS. 18A-18C are views each illustrating a modification example of a shape of a light transmission section and a light reflection section of an opening member.
Figure 18A:
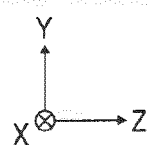
Figure 18B:
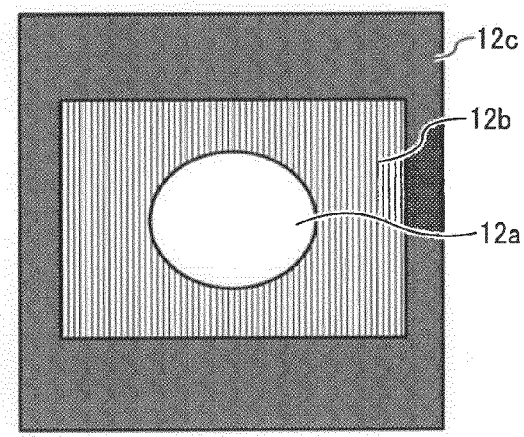
Figure 18B:
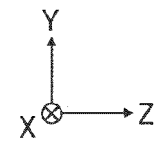
Figure 18C:
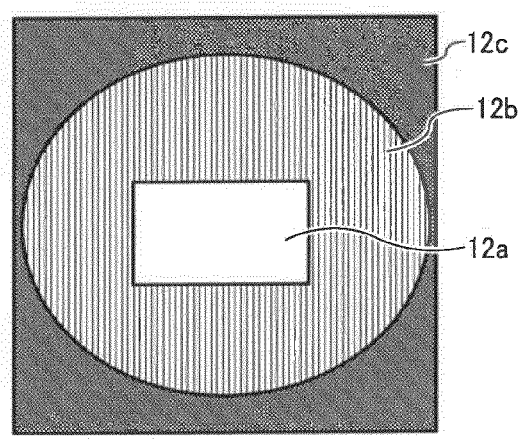
Figure 18C:
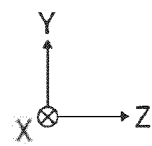

In the above embodiment, the light transmission section 12a is the circular shape, and the light reflection section 12b is a doughnut shape. However, they are not limited thereto, and various shapes can be used (refer to FIGS. 18A-18C). The shape of the light transmission section 12a can be determined according to the light spot shape on the surface of the photoconductive drum 1030. The shape of the light reflection section 12b can be determined according to the beam shape and the power of the light received by the light detector 20.

Figure 19:
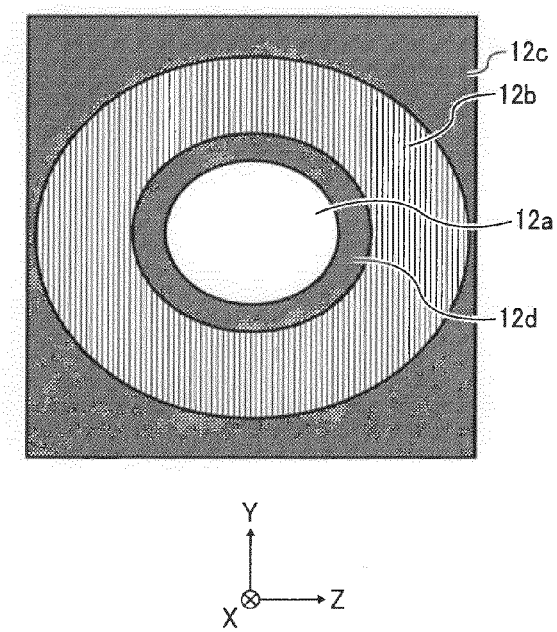
FIG. 19 is a view describing a modification example 7 of a light reflection section of an opening member.

It is desirable to use the light adjacent to the light (light passing through the light transmission section 12a) used for scanning (image formation) as the monitoring light. However, in view of the optical layout, a light shielding section 12d similar to the light shielding section 12c can be provided between the light transmission section 12a and the light reflection section 12b as illustrated in FIG. 19 as one example.

The APC control in the above embodiment can be applied as an APC control from outside even if a conventional end surface-emitting laser is used.

The light receiving area of the light detector 20 can be one area or a plurality of areas. When the light receiving area of the light detector 20 is one area, the intensity of the light emitted from each of the light-emitting sections can be measured by time division. When the light receiving area of the light detector 20 is a plurality of areas, the intensity of the light emitted from each of the light-emitting sections can be measured by each of the areas corresponding to each of the light-emitting sections. The intensity of the light emitted from a plurality of light-emitting sections can be measured at one time, and the measuring method of the light intensity can be selected according to the features and stability of the light-emitting section.

In the above embodiment, the coupling optical system includes one optical element. However, the coupling optical system is not limited thereto. The light reflected by the opening member 12 can be received by the light detector 20 via a plurality of optical elements of the coupling optical system.

In the above embodiment, the light source includes a plurality of light-emitting sections. However, it is not limited thereto, and the light source may include one light-emitting section.

In the above embodiment, the laser printer 1000 is used as the image forming apparatus. However, the image forming apparatus is not limited thereto. For example, a digital copier, a scanner, a facsimile, and a digital complex machine each of which has the optical scanning device 1010 can be used. Namely, as long as the image forming apparatus includes the optical scanning device 1010, a high quality image can be formed without increasing the size and the costs.

In this case, the image forming apparatus can directly irradiate laser light to a medium (for example, a paper) which colors by laser light.

Moreover, an image forming apparatus using a silver salt film as an object to be scanned is used. In this case, a latent image is formed on a silver salt film by optical scanning, and this latent image can be visualized by a process similar to the development process in a general silver halide photography process. Then, the latent image can be transferred onto a developing paper by a process similar to the printing process in a general silver halide photography process. Such an image forming apparatus can be used as an optical printmaking apparatus or an optical drawing apparatus which draws a CT scan image or the like.

Even if the image forming apparatus, which forms a color image having various colors, is used, a high quality image can be formed by using the optical scanning device corresponding to the color image having various colors without increasing the size and the costs.

Figure 20:
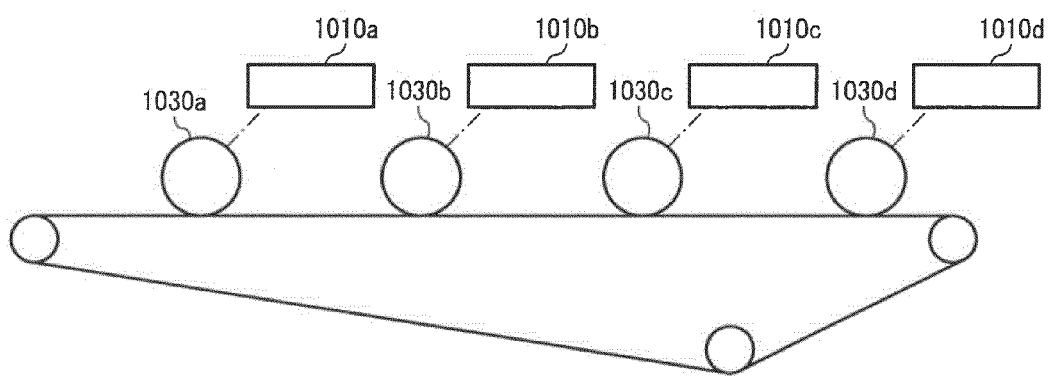
FIG. 20 is a schematic view illustrating a tandem color apparatus.

For example, as illustrated in FIG. 20, the image forming apparatus can be a tandem color apparatus having photoconductive drums each corresponding to each of the various color images (yellow image information, magenta image information, cyan image information, black image information) and each of the image information. This tandem color apparatus includes an optical scanning device 1010a which forms a latent image of a yellow image information on a photoconductive drum 1030a for the yellow image information, an optical scanning device 1010b which forms a latent image of a magenta image information on a photoconductive drum 1030b for the magenta image information, an optical scanning device 1010c which forms a latent image of cyan image information on a photoconductive drum 1030c for the cyan image information, and an optical canning device 1010d which forms a latent image of black image information on a photoconductive drum 1030d for the black image information.

As described above, the optical scanning device according to the embodiment of the present invention is suitable for detecting the intensity of the light emitted from the light source and for forming a high quality image with high accuracy, without increasing the size and the costs, and reducing the light use efficiency.

As described above, according to the embodiment of the present invention, the diameter of the light beam, which scans the surface to be scanned, is determined by the light control reflection member, and a part of the light which is not used for scanning is reflected toward at least one optical element of the coupling optical system. The light reflected by the light control reflection member via the optical element of the coupling optical system is received by the light detector. Accordingly, without increasing the size and the costs, and reducing the light use efficiency, the intensity of the light emitted from the light source can be detected with high accuracy.

Moreover, according to the embodiment of the present invention, the image forming apparatus includes at least the optical scanning device according to the embodiment of the present invention. As a result, a high quality image can be formed without increasing the size and the costs.

Although, the present invention has been described in terms of the exemplary embodiment, it is not limited thereto. It should be appreciated that variations may be made in the embodiment described by persons skilled in the art without departing from the scope of the present invention as defined by the following claims.

What is claimed is:

1. An optical scanning device, which scans a surface to be scanned by light, comprising:
    a light source;
    a coupling optical system, which changes light from the light source into approximately parallel light;
    a light control reflection member which is disposed in an optical path of the light from the coupling optical system, the light control reflection member defining a diameter of a beam of the light which scans the surface to be scanned, and reflecting a part of the light which is not used for the scanning toward the coupling optical system, the light control reflection member includes a light transmission section which transmits incident light, and a light reflection section, different from the light transmission section, which reflects the incident light, an entrance face of the light reflection section includes a reflection diffracting face; and
    a light detector which receives the light reflected by the light control reflection member via the coupling optical system,
    wherein the light transmission section comprises an opening, and the light transmission section and the light reflection section are both part of a single structure which is the light control reflection member.

2. The optical scanning device according to claim 1, wherein the light transmission section is a portion transparent to the incident light.

3. The optical scanning device according to claim 2, wherein a surface of the light transmission section is covered with a reflection prevention film.

4. The optical scanning device according to claim 1, wherein a diffracting pattern of the reflection diffracting face includes a binary structure.

5. The optical scanning device according to claim 1, wherein a diffracting pattern of the reflection diffracting face is a one-dimensional periodic diffracting pattern.

6. The optical scanning device according to claim 1, wherein a diffracting pattern of the reflection diffracting face is a one-dimensional non-periodic diffracting pattern.

7. The optical scanning device according to claim 1, wherein a diffracting pattern of the reflection diffracting face is an orbicular zone-shaped diffracting pattern.

8. The optical scanning device according to claim 1, wherein a diffracting pattern of the reflection diffracting face is a computer-generated hologram pattern.

9. The optical scanning device according to claim 1, wherein the entrance face of the light reflection section is inclined relative to a virtual plane orthogonal to an incident direction of the light.

10. The optical scanning device according to claim 1, wherein the light reflection section includes a mirror face, and the mirror face is inclined relative to a virtual plane orthogonal to an incident direction of the light.

11. The optical scanning device according to claim 1, wherein the light reflection section is disposed in a circumference of the light transmission section.

12. The optical scanning device according to claim 1, wherein the light source and the light detector are integrated.

13. The optical scanning device according to claim 1, wherein the light source includes a surface-emitting laser having at least one light-emitting section.

14. An image forming apparatus, comprising:
    at least one object to be scanned; and
    at least one optical scanning device according to claim 1, which scans the object to be scanned by light having image information.

15. The image forming apparatus, according to claim 14, wherein the image information is multi-colored image information.

* * * * *